US008032669B2

(12) United States Patent
Puri et al.

(10) Patent No.: US 8,032,669 B2
(45) Date of Patent: Oct. 4, 2011

(54) UNIVERSAL DMA (DIRECT MEMORY ACCESS) ARCHITECTURE

(75) Inventors: Rahoul Puri, Los Altos, CA (US); Arvind Srinivasan, San Jose, CA (US); Elisa Rodrigues, Union City, CA (US)

(73) Assignee: Oracle America, Inc., Redwood Shores, CA (US)

( * ) Notice: Subject to any disclaimer, the term of this patent is extended or adjusted under 35 U.S.C. 154(b) by 227 days.

(21) Appl. No.: 12/017,039

(22) Filed: Jan. 20, 2008

(65) Prior Publication Data

US 2009/0187679 A1    Jul. 23, 2009

(51) Int. Cl.
*G06F 13/28* (2006.01)
(52) U.S. Cl. .......................................................... 710/22
(58) Field of Classification Search ....... 710/22
See application file for complete search history.

(56) References Cited

U.S. PATENT DOCUMENTS

| | | | | |
|---|---|---|---|---|
| 5,638,367 | A * | 6/1997 | Gaytan et al. ................. | 370/471 |
| 5,778,180 | A * | 7/1998 | Gentry et al. ................. | 709/212 |
| 6,941,390 | B2 * | 9/2005 | Odom ............................. | 710/22 |
| 7,415,549 | B2 * | 8/2008 | Vemula et al. ................. | 710/22 |
| 2005/0213603 | A1 * | 9/2005 | Karighattam et al. ........ | 370/463 |

* cited by examiner

*Primary Examiner* — Henry Tsai
*Assistant Examiner* — Eric Oberly
(74) *Attorney, Agent, or Firm* — Park, Vaughan, Fleming & Dowler LLP

(57) ABSTRACT

A universal DMA (Direct Memory Access) engine can be dynamically configured to function in either a receive or transmit mode. DMAs are logically assembled and bound as needed, without limitation to a fixed, pre-determined number of receive engines and transmit engines. Because a DMA engine may be dynamically assembled to support the flow of data in either direction, varied usage models are enabled, and components used to assemble a receive DMA engine for one application may be subsequently used to assemble a transmit engine for a different application. An application may request a specific number of each type of engine, depending on the nature of its input/output traffic. The number of receive or transmit engines can be dynamically increased or decreased without suspending or rebooting the host. A universal DMA architecture provides a unified software framework, thereby decreasing the complexity of the software and the hardware gate count cost.

13 Claims, 4 Drawing Sheets

UNIVERSAL DMA (DIRECT MEMORY ACCESS) ARCHITECTURE

BACKGROUND

This invention relates to the fields of computer systems and data communications. More particularly, a universal DMA (Direct Memory Access) architecture is provided, capable of transferring data in either the receive or transmit direction.

Many I/O components and devices (e.g., a network interface circuit) include DMA engines for transferring data to or from host memory. Traditional DMA engines are constructed statically, and are permanently limited to transferring data in one direction only (i.e., receive or transmit).

The quantity of DMA engines for transferring data in either direction must be selected during design of the component, and once this aspect of the design is set there is no flexibility to alter the mix of receive and transmit engines. Each engine is inextricably bound to either a receive client or a transmit client and thus can only process communications in either the receive or transmit path. This severely limits the component's flexibility in that it cannot evolve or be reconfigured to more efficiently meet the needs of a particular application or set of applications.

For example, if a component is constructed with an equal number of receive and transmit DMA engines, it may adequately satisfy input/output demands for applications that have roughly equivalent input and output demands. However, this configuration will be very inefficient for an application or group of applications that receive significantly more data than they transmit (or vice versa).

SUMMARY

In one embodiment of the invention, a universal DMA (Direct Memory Access) engine framework or architecture is provided, which allows DMA engines to be dynamically configured during system operation to function in either a receive or transmit mode.

Universal DMA engines are logically assembled and bound as needed from a pool of components, without limitation to a fixed, pre-determined number of statically configured receive engines and transmit engines. Because a DMA engine may be dynamically assembled to support the flow of data in either direction, varied usage models are enabled, and components used to assemble a receive DMA engine for one application may be subsequently used to assemble a transmit engine for a different application, and vice versa.

An application may request a specific number of each type of engine, depending on the nature of its input/output traffic. The number of receive or transmit engines can be dynamically increased or decreased without suspending or rebooting the host. The universal DMA architecture provides a unified software framework, thereby decreasing the complexity of the software and the hardware gate count cost.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an architecture is provided for a universal DMA (Direct Memory Access) engine capable of being configured to transfer data in either direction (i.e., receive or transmit). From a pool of DMA components, a DMA may be dynamically configured for either direction upon request by a software application. In this embodiment, the number and configuration of DMA engines need not be determined or applied at the time the host is initialized. The universal and dynamic nature of the DMA architecture therefore allows the number of each type of DMA engine to fluctuate during system operation, as DMA engine components are returned to and drawn from the pool.

In one implementation of an embodiment of the invention, a design for an input/output device can be tested without employing or modeling an external communication (e.g., network) connection. In particular, one set of DMA engines can be configured to act in a transmit mode to feed data to the device under test (DUT) from one host, and another set of DMA engines can be configured to receive the output of the DUT at the same or another host. The dynamic and universal nature of the architecture allows the DMA engine configuration to be modified as desired during testing.

Figure 1:
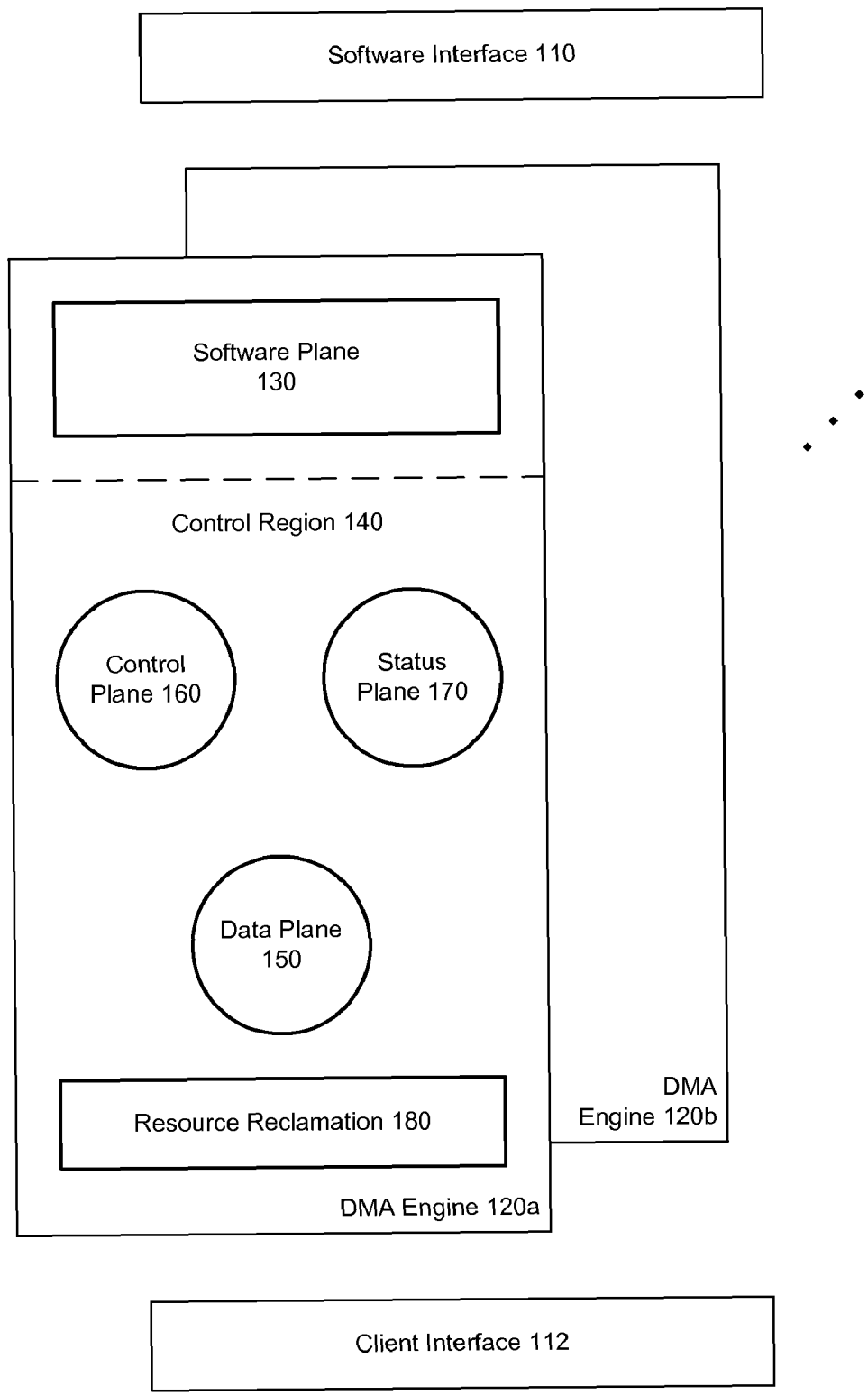
FIG. 1 is a logical diagram of a DMA pool in which receive and transmit DMA engines may be dynamically configured, in accordance with an embodiment of the present invention.

FIG. 1 is a logical view of a DMA pool within a universal DMA architecture according to one embodiment of the invention. A pool may consist of a fluctuating number of configured DMA engines, with the number of receive engines and transmit engines subject to change dynamically according to the input/output needs of a host computer and/or applications operating on the host.

Within DMA pool 102, a unified software interface 110 enables use of a single DMA management scheme and syntax for configuration and management of RX (receive) and TX (transmit) DMA engines. Similarly, client interface 112 enables use of a uniform interface for communication with RX and TX client logic. Each DMA engine within pool 102 can be independently and dynamically configured or reconfigured for either a RX or TX channel.

Each DMA engine 120 (e.g., engine 120a) in this embodiment of the invention comprises a software plane, exemplified by software plane 130. The software plane defines the portion of a DMA engine visible to the application or other entity that owns the engine, and embodies a unified interface for communicating with the software for managing and controlling (e.g., programming) DMA resources, and for supporting software notification control and conditional event trigger installation.

As a result, software operating on a host can employ the same programming model for all DMA engines, regardless of the direction of travel of the communications they process. For example, descriptors can be configured and posted using a single interface, for both receive and transmit channels, and may include attributes identifying where the corresponding data is currently located, and its destination.

Software plane 130 supports multiple types of notifications, including message-based and interrupt-based forms of software notification. In addition, the software plane allows software to install conditional event controls as triggers for notification.

Whereas software plane 130 is exposed to software via software interface 110, the other illustrated components of DMA engine 120a—data plane 150, control plane 160, status plane 170 and resource reclamation process 180—provide service to an attached RX or TX client and may be considered to form a "control region" of the DMA engine. Control region 140 and software plane 130 interact to ensure software attributes are fetched and posted between host memory and the control region, and to allow DMA local attributes to be reported to the software plane.

Within the control region, data plane 150 performs the actual transfer of data, using an RX client or TX client, based on the attributes of descriptors received from control plane 160. An illustrative descriptor identifies the location of the data, its length, and one or more operations to perform on the data, including where to send it. The universal architecture allows a DMA engine to transfer data through a RX client or TX client using the same syntax, regardless of the type of client.

Control plane 160 is primarily concerned with the processing of descriptors for communicating between software and hardware. From a ring populated by software, it fetches software-posted descriptors containing receive or transmit context (e.g., buffers for packets being received, attributes for packets being transmitted), without knowing or caring whether the descriptors are for receive or transmit data. It can also populate the ring with hardware-posted descriptors comprising received packet information.

Status plane 170 detects and reports status information to the DMA's client and/or the owner of the DMA. Illustratively, the status plane receives status information (e.g., location of processing within the descriptor ring, error notifications) from the data plane and may forward that information and/or take necessary action (e.g., halt the engine in case of a RX error; skip the current packet in the case of a TX error). For example, every time the hardware processes a descriptor, it may update the status plane to reflect the status of the associated work.

In one implementation of the illustrated embodiment of the invention, status plane 170 incorporates both a DMA status framework and a client status framework. The DMA status framework detects and reports the DMA's status to the client, while the client status framework detects status information at the client side (e.g., a dropped communication connection, client memory error).

As described below, DMA engine 120a is dynamically assembled upon demand by the software application that owns the DMA engine, which populates descriptors for consumption by control plane 160. The descriptors may correspond to any size or type of packet, with attributes identifying the location of the packet's data, the amount of data, options to perform (e.g., checksum offload, CRC computation) and/or other information needed to process the packet.

For each descriptor processed by control plane 160, a corresponding entry or status is set in status plane 170, which may involve updating an internal register or writing to host memory. The amount and type of status information may differ, depending on whether the packet is being received or transmitted. In one implementation, the status information is passed from the data plane to the status plane as a number of bytes (e.g., 64 bytes for a receive packet, 16 bytes for a transmit packet) and an address at which the bytes should be stored.

Resource reclamation process 180 facilitates descriptor and buffer reuse after consumption by the DMA engine. It accepts input from status plane 170 (e.g., reporting consumption of a descriptor) as well as control plane 160 (e.g., reporting transfer of another descriptor's contents into the DMA). While data plane 150, control plane 160 and status plane 170 operate in DMA hardware, resource reclamation process 180 operates in software in the illustrated embodiment of the invention.

Figure 2:
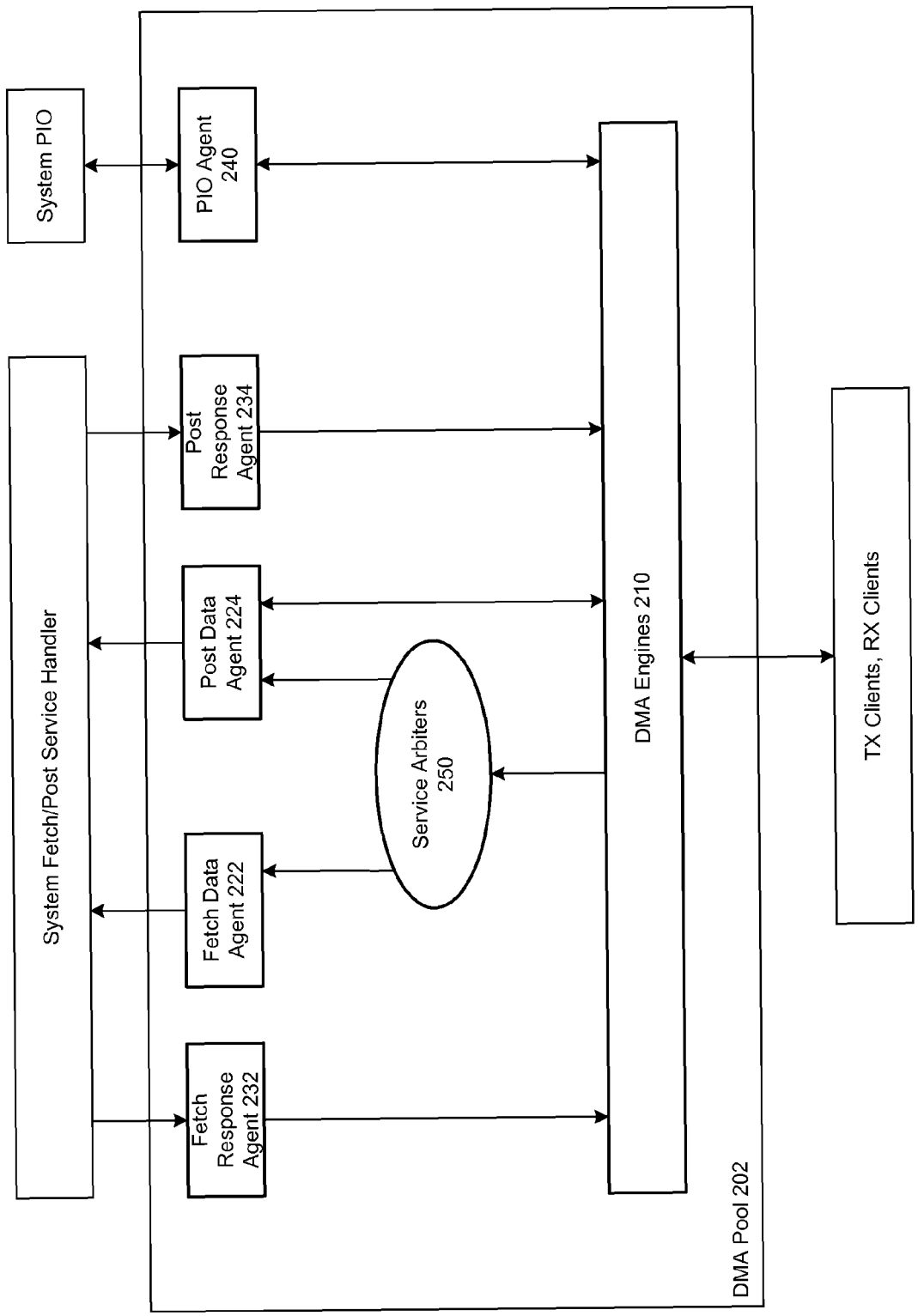
FIG. 2 is a block diagram of a DMA pool, in accordance with an embodiment of the invention.

FIG. 2 is a block diagram of a DMA pool according to one embodiment of the invention. In this embodiment, DMA pool 202 comprises a number of DMA engines 210, various agents 222, 224, 232, 234, 240 and one or more service arbiters 250.

Fetch data agent 222 issues fetch data requests to the host via System Fetch/Post Service Handler, with fetch data responses being received by fetch response agent 232. Fetch response agent 232 correlates the responses (e.g., data) it receives with requests launched by fetch data agent 222, and may perform operations such as reordering responses as needed, maintaining context updates and detecting errors.

Post data agent 224 issues post data requests, with post data acknowledgements being received by post response agent 234. PIO agent 240 implements a system programming interface to interact with system PIO and/or a local bus.

Service arbiter(s) 250 act as global agents to receive and arbitrate service requests from DMA engines 210, based on any desired arbitration scheme (e.g., round robin, a priority-based scheme).

In FIG. 2, the System Fetch/Post Service Handler and the System PIO (Programmed Input/Output) are part of the host computer system or communication entity. PIO Agent 240, in combination with the System PIO, provides the software interface (e.g., software interface 110 of FIG. 1) that allows host software to communicate with DMA engines 210. A combination of PIO agent 240 and post data agent 224 may be considered to constitute the software plane of a particular engine.

A combination of fetch data agent 222 and fetch response agent 232 may be considered to constitute a control plane because they pass descriptors to the DMA engines for consumption. A data plane may be envisioned as incorporating the RX and TX clients, which are coupled to DMA engines 210 via a client interface (e.g., client interface 112 of FIG. 1).

In this embodiment of the invention, the software plane and control region of a DMA engine (see FIG. 1), may be envisioned as straddling the logical boundary of the DMA engine, such that they operate within and without the engine. For example, when operated in a mode that requires address translation that is outside the scope of the standard software plane, a DMA engine may be programmed through a different software plane (e.g., a hypervisor) that uses the standard software plane to configure the engine.

Figure 3:
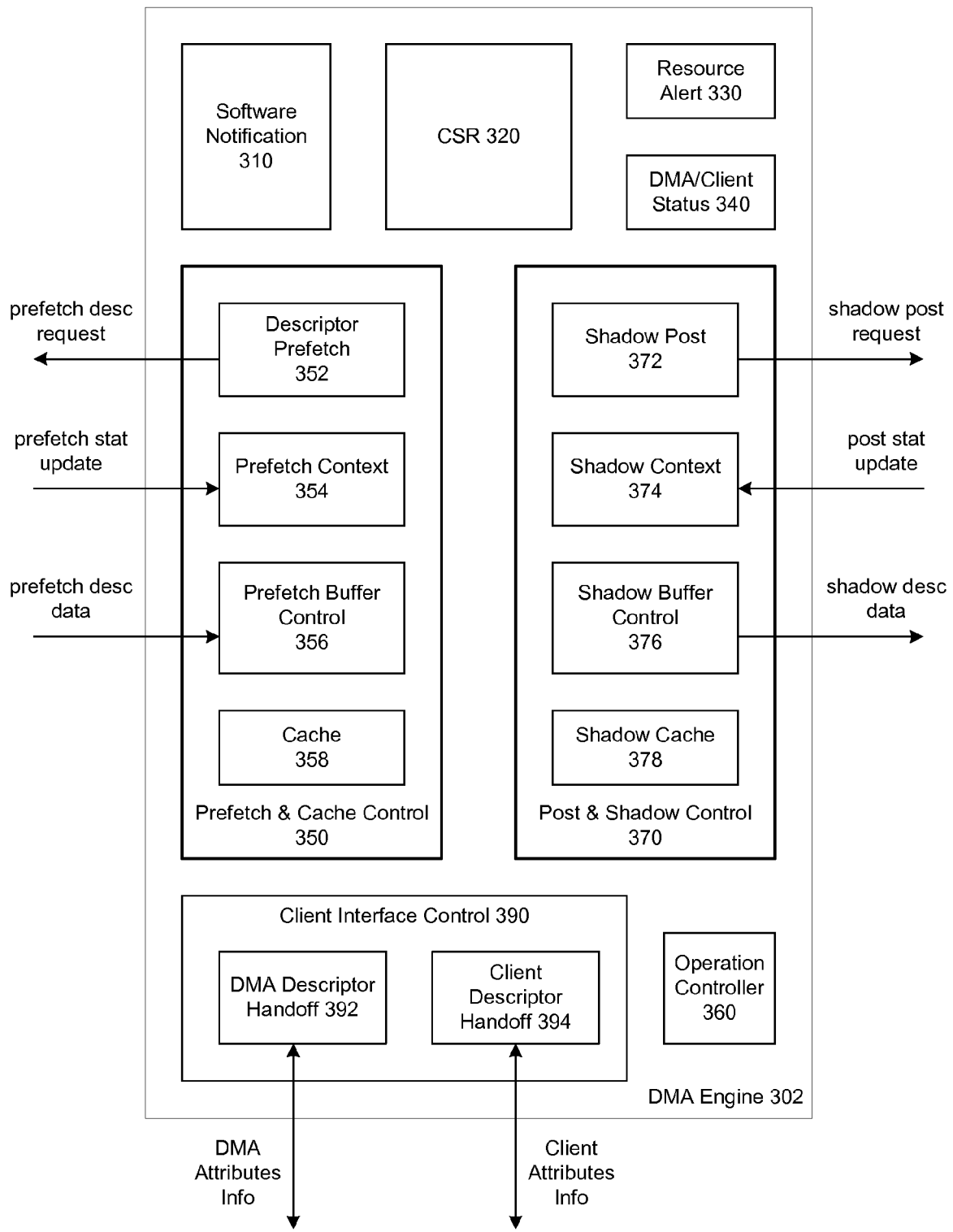
FIG. 3 is a block diagram of an illustrative DMA engine dynamically constructed according to a universal DMA architecture, in accordance with an embodiment of the present invention.

FIG. 3 is a block diagram of a DMA engine configured according to the universal DMA architecture of an embodiment of the invention. The DMA engine is bound to a single client resource, which supports one channel of RX or TX context. A collection of DMA engines can be dynamically assembled and re-assembled from a pool to support multiple channels of RX or TX context.

DMA engine 302 is configured for both prefetch and post functions. Prefetch attributes include descriptors for transmit packets and buffer resources for receive packets, with the prefetch resources being stored and forwarded to the engine's receive or transmit client. Post attributes include completion descriptors (for receive packets from a receive client) and mailbox notifications. The completion descriptors are stored in a shadow, and the post function transports contents of the shadow to system memory.

The software plane of the DMA engine (see FIG. 1) allows for various configuration, control and resource management of the DMA. For example, it allows the DMA's attributes to be set, including the type of engine (i.e., RX, TX). The software plane also allows operation of DMA engine 302 to be changed using one of the following state changes: enable (e.g., change DMA from reset to active state), reset (e.g., change DMA from active state to power on state), stop (e.g., stop DMA while in active state) and resume (e.g., change DMA from stop state to active state). The current state of the DMA engine can be viewed by software.

One type of entity that operates with DMA engine 302 but is not depicted in FIG. 3 is a descriptor ring that is maintained in software but copied into the DMA hardware. Descriptor rings used by the DMA engines may be populated with two classes of descriptors—software-posted and hardware-posted. Software-posted descriptors are posted to system memory by software, and fetched and cached by hardware for local use within the DMA engine. Hardware-posted descriptors are posted to system memory by hardware and read by software for processing received packets.

Among these two classes of descriptors are 3 descriptor types. Software-posted descriptors with TX context (transmit packet information), software-posted descriptors with RX context (receive buffer information), and hardware-posted descriptors with RX context (receive packet information). Each type of descriptor may have a separate structure.

The portion of the descriptor ring (or a separate ring) to which hardware-posted descriptors are posted may be termed a Completion Ring. In other words, separate descriptor rings may be maintained for software-posted descriptors and for hardware-posted descriptors. For a software-posted descriptor ring, software manages the write pointer while hardware manages the read pointer. For a completion ring, hardware manages the write pointer while software manages the read pointer.

Each DMA engine is statically bound to a software-posted descriptor ring, which will pertain to either receive or transmit context depending on the type of DMA engine. A software-posted descriptor ring may therefore be dedicated to a single DMA engine.

However, a hardware-posted descriptor ring may be shared among multiple DMA engines in order to reduce the DMA pool's footprint, but only DMA engines operating for receive traffic need access to this type of ring. Because this type of ring is only needed for receive traffic, and because they can be shared, fewer hardware-based descriptor rings may be needed than software-posted descriptor rings.

Thus, in one embodiment of the invention, a DMA pool contains separate sets of resources for software-based descriptor rings and for hardware-based descriptor rings. Depending on the type of DMA engine being configured at any given time (i.e., RX, TX), the appropriate resources are bound.

A trigger for posting to a completion ring may be initiated by either software or hardware. Hardware possesses a set of pre-defined conditions (e.g., a type of error) that trigger a hardware-initiated post. In addition, software is capable of forcing a post to the completion ring, and a software notification event may also trigger a post.

For example, software may set a mark bit or other type of notification flag within a descriptor in a transmit or receive descriptor ring. When the hardware processes that entry in the ring, it notifies the software. Or, software may set a timer at the expiration of which hardware is to notify the software.

In FIG. 3, software notification element 310 includes a mailbox post control and an event trigger in the illustrated embodiment of the invention. The mailbox post function detects conditions corresponding to a mailbox operation, collects and integrates data into the mailbox, and performs status update operations.

Software notification 310 also issues mailbox post requests to software, receives mailbox status updates and supports address translation functions. The mailbox may be implemented as a one-entry descriptor ring populated by hardware with either software-initiated or hardware-initiated triggers.

Software notification 310 interfaces with CSR 320 and with client interface control 390.

The event trigger function of software notification 310 supports software installed event triggers, and includes timer logic, comparison logic and client event notification detection logic. Occurrence of an event associated with a trigger is communicated to a specified function or element, such as the mailbox post control. Illustrative events include expiration of a timer or the processing of a threshold number of transmit or receive packets, after which software is notified.

In one implementation, the following trigger mechanisms are supported: marker-based, threshold-based and timer-based. With a marker-based trigger a mark indicator is embedded in a descriptor (e.g., a software-posted descriptor) to indicate the trigger point for a notification. A threshold-based trigger may illustratively be based on a number of transferred packets. A timer-based trigger may be based on a timer value. When a notification is triggered, software is notified based on the registered notification method (e.g., mailbox-based or interrupt-based).

For mailbox-based notification, hardware performs a post to system memory. The location of the post is one of the attributes of the mailbox ring. The mailbox post is performed after software reflection of the hardware shadow states is updated.

For interrupt-based notification, an interrupt flag is employed, which may be an integration of multiple event flags. For each interrupt event source, a mask is provided to disable or enable contribution from that event.

CSR (Control and Status Register) 320 embodies the software interface the DMA uses to communicate with software, fetch descriptors, post completion descriptors, etc. It comprises a set of registers read and written by the software to control the DMA.

Resource alert 330 kicks in when the number of descriptors available to the DMA falls to or below a threshold. It is configured to generate a notification to software to identify the status (e.g., the number of descriptors available or simply a warning that the number of available descriptors is low).

DMA/Client status 340 communicates with software to notify it of errors associated with the DMA and/or with the DMA's client.

Responsibilities of Prefetch & Cache Control 350 include detecting conditions for prefetch, constructing prefetch request attributes, determining a local storage location for prefetched data, maintaining descriptors related with DMA context and communicating with a global agent (e.g., service arbiter(s) 250 of FIG. 2) for request and response services. In particular, a software-posted descriptor ring providing attributes of transmit packets or buffers for storing receive packets is consumed by prefetch & cache control 350, and eventually by the DMA's client.

Prefetch & cache control 350 interfaces with CSR 320, a prefetch request (data) agent and prefetch response agent, and client interface control 390.

Descriptor prefetch 352 is responsible for making data (e.g., attributes of transmit packets, receive buffers) available to the client of the DMA engine, by fetching descriptors from the descriptor ring. The contents of the fetched descriptors are placed in cache 358, which is managed by prefetch buffer control 356.

As long as there are descriptors available and local storage for descriptor contents is not full, descriptor prefetch 352 may continue to operate. In one implementation the descriptor prefetch may perform its work only when a threshold amount of storage space is available (or conversely, filled).

Fetch requests are submitted to a fetch data agent (e.g., fetch data agent 222 of FIG. 2), with responses being received from a fetch response agent (e.g., fetch response agent 232 of FIG. 2).

Prefetch context 354 maintains context of the descriptor ring being consumed by prefetch & cache control 350. As descriptors are read and consumed, prefetch context 354 advances a "shadow" head pointer identifying the next unused descriptor in the ring, and also monitors (and/or may update) the normal head and tail pointers of the ring.

In one implementation, prefetch context 354 tracks how many descriptors have already been retrieved from a set of descriptors made available by software, and also monitors how much storage space for additional descriptor contents is available in prefetch cache 358. It can therefore easily determine how many more descriptors can and should be fetched, as well as the best manner of doing so (e.g., individually, at a cache-line boundary).

Prefetch buffer control 356 stores the contents of descriptors fetched from the descriptor ring in cache 358 until they have been consumed (i.e., used to transmit outgoing packets or pass to the host contents of incoming packets), and monitors the status of the cache (e.g., how full, how empty).

Cache 358 serves as local storage for prefetch & cache control 350, to store contents of fetched descriptors. The cache may also be used to store state or status information (e.g., memory protection, number of entries per line). For example if the cache is configured for two entries per line, and software kicks only a single descriptor (i.e., one entry), the second entry will be marked as null in the event the cache cannot do a read-modify-write operation for subsequent kicks.

More than one descriptor may be fetched at a time, depending on how many are available and the amount of available local storage, and other factors such as the configuration of the descriptor ring. For example, if there is a gap in the address range of receive buffers described by consecutive descriptors, one fetch operation may halt at the gap.

Post & Shadow Control 370 populates a completion ring for passing received packets to the system. It receives shadow update requests from the client, performs writes to the shadow, maintains shadow-related DMA context and determines when the shadow should be posted to system memory. Post & shadow control 370 interfaces with CSR 320, a post request (data) agent and post response agent, and client interface control 390.

Posts are made to a post data agent (e.g., post data agent 224 of FIG. 2) and acknowledgements are received from a post response agent (e.g., post response agent 234 of FIG. 2). Software versions of completion states are updated only after confirmation of a post.

Shadow post 372 issues shadow post requests to post data to software. In different embodiments of the invention, differing numbers of post events may be in flight at a given time. Post sizes may be on the order of a cache line boundary (e.g., 64 bytes).

When data is posted by shadow post 372, a copy may be kept in cache 378 until the post is acknowledged. In addition, even after a post has been acknowledged, its content may be maintained until an entire atomic post operation (e.g., 64 bytes or a cache line boundary) has been posted. Until the entire atomic post operation is completed, smaller posts (e.g., 8 bytes) made within the atomic post operation's space may be re-sent to ensure data coherency.

Shadow context 374 manages the context of the receive completion ring used to post data to the software. It maintains pointers into the shadow buffer to keep track of what has been posted and which posts have been acknowledged.

Shadow buffer control 376 keeps track of which or how many entries have been written to shadow cache 378, so that the next entry to be posted can be placed correctly.

Shadow cache 378 serves as local storage for post & shadow control 370, to store entries (e.g., messages) to be posted to a completion ring. The cache also stores un-acknowledged posts and other posted messages that must be retained. Similar to cache 358, shadow cache 378 may also store status information, but in regard to hardware descriptors rather than software descriptors.

On behalf of the DMA engine's client, client interface control 390 consumes prefetched descriptors or produces shadowed descriptors, depending on the type of DMA engine and client (e.g., receive, transmit). DMA descriptor handoff 392 interacts with prefetch & cache control 350, while client descriptor handoff 394 interacts with post & shadow control 370. Client interface control 390 also interacts with CSR 320.

Operation controller 360 provides control over the operation of DMA engine 302, to facilitate modification of the engine's state (e.g., active, stop, power on), as described above.

In one implementation of the embodiment of the invention illustrated in FIG. 3, resource alert 330 operates within the software plane of the engine (see FIG. 1), and software notification 310 exists within both the software plane (for setup and control) and control region (for operation). The remaining illustrated elements of the DMA engine operate within the control region.

Figure 4:
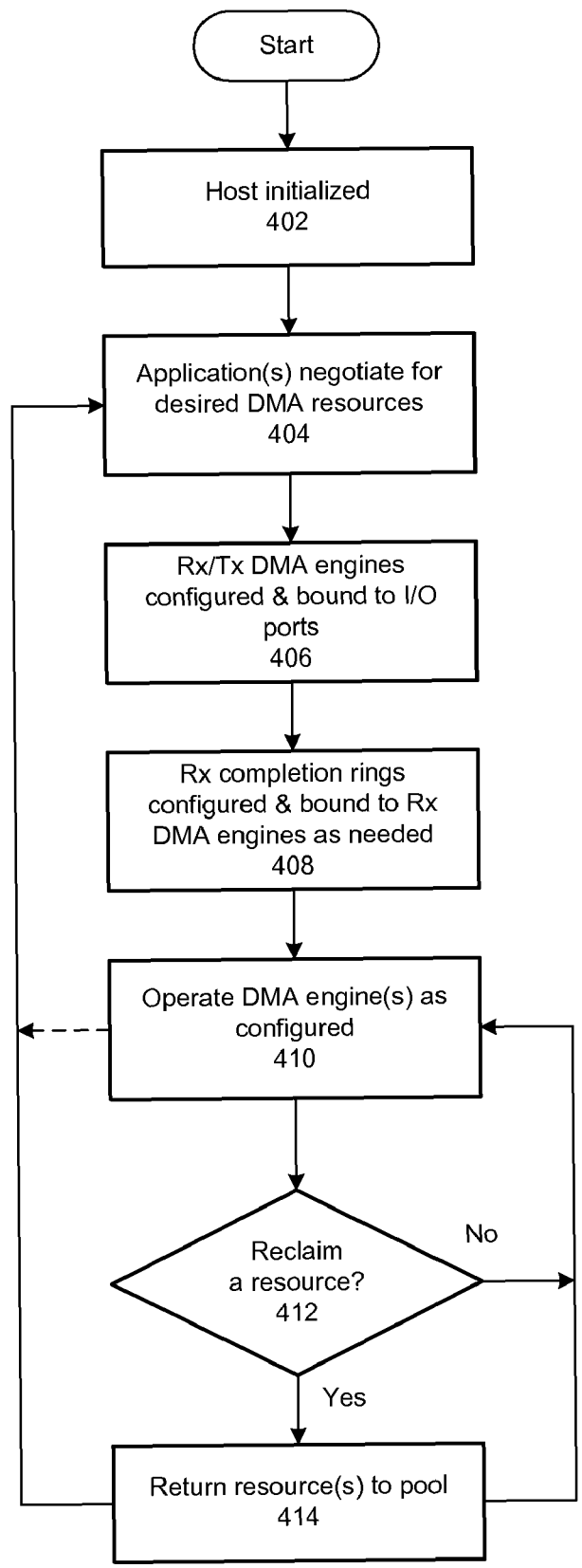
FIG. 4 is a flowchart demonstrating assembly or re-assembly of universal DMA engines, in accordance with one embodiment of the invention.

FIG. 4 is a flowchart demonstrating assembly or re-assembly of universal DMA engines according to one embodiment of the invention.

In operation 402, a host computer system is initialized. The host computer system is configured to employ universal DMAs for input/output, or includes a module (e.g., a network interface card) that employs universal DMA engines.

In operation 404, one or more applications, utilities or other consumers that will perform input/output via the universal DMAs negotiate with the host system or a controller on the input/output module, to obtain desired DMA resources. The resources an application may request include Rx and/or Tx DMA engines, as well as receive completion rings for the Rx DMA engines.

Depending on the size of the resource pools, the number of applications requesting resources, the amount of resources requested by the applications, any priorities awarded to the applications and/or other factors, a given application may receive all, some or none of its desired resources. If the resource pools are exhausted when another request is received from an application, resources may be retracted from another application in order to provide some level of support to the new application.

In operation 406, one or more pools of DMA resources and completion ring resources are drawn upon to configure the negotiated number and type of DMA engines. Because a universal DMA engine is constructed dynamically according to current demand, the resources may be allocated, de-allocated and re-allocated as needed.

As part of the configuration process, each DMA engine is bound to a particular receive or transmit port and client.

In operation 408, one or more receive completion rings are configured and bound to the Rx DMA engines (assuming at least Rx DMA engine is constructed).

In operation 410, the universal DMA engines function in their currently assigned roles (as either Rx or Tx engines). As the allocated DMA resources operate, the method may return to operation 404 as additional resources are requested (if resources are available).

In operation 412, if a resource is to be reclaimed (e.g., an application terminates, resources are required for a new application), the illustrated method advances to operation 414. Otherwise, the universal DMAs continue to function as programmed.

In operation 414, resources of one or more Rx and/or TX DMA engines are returned to the DMA pool, and/or a receive completion ring may be de-allocated. After operation 414, the method may return to operation 410 or, if a new allocation of resources is needed, may return to operation 404.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A universal DMA (Direct Memory Access) engine architecture for processing either receive or transmit communications, wherein a DMA engine configured according to the architecture comprises:
 a software interface for enabling software operating on a host to manage the DMA engine;
 a client interface for interacting with either a receive client or a transmit client;
 a data plane configured to perform direct memory access for either receive or transmit communications; and
 a separate software-posted descriptor ring that is statically and uniquely bound to the DMA engine and, if the DMA engine is configured as a receiver, a hardware-posted descriptor ring bound to the DMA engine, wherein the hardware-posted descriptor ring is shared between the DMA engine and any other DMA engines that are configured as receivers, and wherein the hardware-posted descriptor ring is not bound to the DMA engine if the DMA engine is configured as a transmitter;
 a control plane configured to fetch to a memory for the DMA engine software-posted descriptors from the software-posted descriptor ring in a memory for the host and to post hardware-posted descriptors to the hardware-posted descriptor ring;
 wherein the software-posted descriptors include transmit packet and receive buffer information and the hardware-posted descriptors include receive packet information.

2. The universal DMA engine architecture of claim 1, the DMA engine further comprising:
 a status plane configured to report the status of the DMA engine to software.

3. The universal DMA engine architecture of claim 2, wherein said status plane is further configured to detect the status of the receive client or transmit client.

4. The universal DMA engine architecture of claim 1, wherein:
 said universal DMA is dynamically constructed from a pool of DMA resources and allocated to a first application; and
 said universal DMA is returned to said pool for reallocation to a second application when the first application terminates.

5. A universal DMA (Direct Memory Access) engine architecture for dynamically constructing a receive or transmit DMA engine from a pool of components by binding components in the pool of components to a DMA engine based on whether the DMA engine is configured as a receive or transmit DMA engine, the pool of components comprising;
 a fetch data agent configured to issue data requests to a host computer;
 a fetch response agent configured to receive the requested data from the host computer, for transmission via a transmit DMA engine;
 a post data agent configured to post to the host computer data received via a receive DMA engine; and
 a service arbiter configured to arbitrate between the transmit DMA engine and the receive DMA engine;
 wherein the fetch response agent is configured to fetch to a memory for the DMA engine software-posted descriptor from a software-posted descriptor ring in a memory for the host computer, wherein the software-posted descriptor ring is a separate descriptor ring that is statically and uniquely bound to the DMA engine;
 wherein the DMA engine is configured to post hardware-posted descriptors to a hardware-posted descriptor ring, wherein the hardware-posted descriptor ring is shared between the DMA engine and any other DMA engines that are configured as receivers, and wherein the hardware-posted descriptor ring is not bound to any DMA engine that is configured as a transmitter; and
 wherein the software-posted descriptors include transmit packet and receive buffer information and the hardware-posted descriptors include receive packet information.

6. The universal DMA engine architecture of claim 5, further comprising:
 a post response agent configured to receive acknowledgement of the posted data from the host computer.

7. The universal DMA engine architecture of claim 5, wherein a DMA engine configured according to the architecture comprises:
- a prefetch and cache control module configured to:
  - issue a data request to the host computer;
  - receive the requested data using a software descriptor ring; and
  - cache the requested data for transmission via a transmit client; and
- a post and shadow control module configured to:
  - receive data from a communication link; and
  - post the received data to the host computer using a receive completion ring.

8. A method of configuring a DMA (Direct Memory Access) engine within a universal DMA architecture, the method comprising:
- receiving a request from a first application program operating on a host for at least one DMA engine to perform input/output;
- in response to the request, dynamically constructing one or more DMA engines from a pool of universal DMA components configurable as either receive or transmit DMA engines, wherein the universal DMA components include a memory for the DMA engine, wherein constructing the DMA engine includes:
- binding a separate software-posted descriptor ring to the DMA engine, wherein the software-posted descriptor ring is statically and uniquely bound to the DMA engine and,
- if the DMA engine is configured as a receiver, binding a hardware-posted descriptor ring to the DMA engine, wherein the hardware-posted descriptor ring is shared between the DMA engine and any other DMA engines that are configured as receivers, and wherein the hardware-posted descriptor ring is not bound to the DMA engine if the DMA engine is configured as a transmitter;
- allocating the DMA engines to the first application program; and
- binding the DMA engines to communication ports.

9. The method of claim 8, further comprising:
- de-allocating the one or more DMA engines;
- returning the components of the DMA engines to the pool; and
- dynamically constructing one or more other DMA engines from the returned components.

10. A non transitory computer readable medium storing instructions that, when executed by a computer, cause the computer to perform a method of configuring a DMA (Direct Memory Access) engine within a universal DMA architecture, the method comprising:
- receiving a request from a first application program for at least one DMA engine to perform input/output;
- in response to the request, dynamically constructing one or more DMA engines from a pool of universal DMA components configurable as either receive or transmit DMA engines, wherein the universal DMA components include a memory for the DMA engine, wherein constructing the DMA engine includes:
- binding a separate software-posted descriptor ring to the DMA engine, wherein the software-posted descriptor ring is statically and uniquely bound to the DMA engine and,
- if the DMA engine is configured as a receiver, binding a hardware-posted descriptor ring to the DMA engine, wherein the hardware-posted descriptor ring is shared between the DMA engine and any other DMA engines that are configured as receivers, and wherein the hardware-posted descriptor ring is not bound to the DMA engine if the DMA engine is configured as a transmitter;
- allocating the DMA engines to the first application program; and
- binding the DMA engines to communication ports.

11. the universal DMA engine architecture of claim 1, wherein the DMA engine is dynamically assembled for a software application operating on the host;
- wherein the software posts the software-posted descriptors to the descriptor ring; and
- wherein the software reads the hardware-posted descriptors from the descriptor ring for processing received packets.

12. The universal DMA engine architecture of claim 11, wherein the software operating on the host manages a pointer for writing the software-posted descriptors to the descriptor ring, and a pointer for reading the hardware-posted descriptors from the descriptor ring; and
- wherein the control plane manages a pointer for reading the software-posted descriptors from the descriptor ring, and a pointer for writing the hardware-posted descriptors to the descriptor ring.

13. The method of claim 8, further comprising:
- receiving a request from a second application program for at least one DMA engine to perform input/output;
- in response to the request received from the second application program, de-allocating one or more of the DMA engines for the first application program, and returning components of the de-allocated DMA engines to the pool;
- dynamically constructing a DMA engine for the second application program from the returned components, wherein the returned components include resources for a completion ring, wherein the completion ring includes hardware-posted descriptors.

* * * * *